United States Patent
Mastro et al.

(10) Patent No.: US 10,408,356 B2
(45) Date of Patent: Sep. 10, 2019

(54) BEVERAGE DISPENSERS WITH ADJUSTABLE VALVES

(71) Applicant: Cornelius, Inc., Osseo, MN (US)

(72) Inventors: Brian Mastro, Des Plaines, IL (US); Hansel Sjukur, Glendale Heights, IL (US); E. Scott Sevcik, Des Plaines, IL (US)

(73) Assignee: Cornelius, Inc., Osseo, MN (US)

( * ) Notice: Subject to any disclaimer, the term of this patent is extended or adjusted under 35 U.S.C. 154(b) by 0 days.

(21) Appl. No.: 15/799,221

(22) Filed: Oct. 31, 2017

(65) Prior Publication Data
US 2018/0135762 A1 May 17, 2018

Related U.S. Application Data (60) Provisional application No. 62/430,648, filed on Dec. 6, 2016, provisional application No. 62/423,282, filed on Nov. 17, 2016.

(51) Int. Cl.
| | |
|---|---|
| *F16K 1/52* | (2006.01) |
| *B67D 1/00* | (2006.01) |
| *B67D 1/12* | (2006.01) |
| *F16K 31/122* | (2006.01) |

(52) U.S. Cl.
CPC ............ *F16K 1/523* (2013.01); *B67D 1/0021* (2013.01); *B67D 1/1281* (2013.01); *B67D 1/1288* (2013.01); *F16K 31/1221* (2013.01); *B67D 1/0051* (2013.01)

(58) Field of Classification Search
CPC ... F16K 1/523; F16K 31/1221; B67D 1/1288; B67D 1/0021; B67D 1/1281; B67D 1/0051
See application file for complete search history.

(56) References Cited

U.S. PATENT DOCUMENTS 2,917,075 A  12/1959  Terry
3,013,790 A * 12/1961  Anderson .......... G05D 16/0636
                                                137/115.03

(Continued)

OTHER PUBLICATIONS

International Search Report and Written Opinion, PCT/US2017/061261, dated Jan. 19, 2018.

*Primary Examiner* — David P Angwin
*Assistant Examiner* — Bob Zadeh
(74) *Attorney, Agent, or Firm* — Andrus Intellectual Property Law, LLP (57) ABSTRACT

A beverage dispensing valve includes a housing defining a chamber with an inlet for receiving a fluid and an outlet for dispensing the fluid. A piston is located in the chamber and subjected to a fluid pressure exerted by the fluid received via the inlet. The piston is moved axially in the chamber by the fluid pressure such that the piston determines a flow characteristic of the fluid dispensed via the outlet. A plunger is received in the chamber, and the fluid pressure tends to move the piston towards the plunger. A spring tends to move the piston away from the plunger, against the fluid pressure. The plunger is axially registered in the chamber in discrete plunger positions, and each plunger position sets a discrete limit on axial movement of the piston thereby determining a predetermined flow characteristic of the fluid dispensed via the outlet.

10 Claims, 9 Drawing Sheets

(56) References Cited

U.S. PATENT DOCUMENTS

| | | | | |
|---|---|---|---|---|
| 3,682,438 | A * | 8/1972 | Klimek | F16K 31/52408 137/116.5 |
| 3,790,028 | A * | 2/1974 | Gardner, Jr. | B67D 1/0021 222/129.4 |
| 4,545,405 | A * | 10/1985 | LaBelle | F16K 17/06 137/524 |
| 4,681,297 | A * | 7/1987 | Mertz | F25B 41/04 137/524 |
| 4,689,042 | A * | 8/1987 | Sarnoff | A61M 5/2066 604/136 |
| 4,795,433 | A * | 1/1989 | Sarnoff | A61K 9/0019 604/134 |
| 5,097,863 | A | 3/1992 | McCann et al. | |
| 5,127,431 | A | 7/1992 | Credle, Jr. | |
| 5,181,631 | A | 1/1993 | Credle, Jr. | |
| 5,299,715 | A | 4/1994 | Feldman | |
| 5,361,943 | A * | 11/1994 | Du | B67D 1/102 222/134 |
| 5,584,815 | A * | 12/1996 | Pawelka | A61M 5/19 604/135 |
| 5,607,083 | A | 12/1997 | Vogel et al. | |
| 5,845,815 | A | 12/1998 | Vogel | |
| 5,950,623 | A * | 9/1999 | Michell | A61M 16/01 128/205.12 |
| 6,161,572 | A | 12/2000 | Credle et al. | |
| 6,691,735 | B1 * | 2/2004 | Harneit | F16K 37/0008 137/505 |
| 8,726,933 | B2 * | 5/2014 | Chen | A61M 16/20 137/524 |
| 9,353,884 | B2 * | 5/2016 | Hasunuma | F16K 31/1221 |
| 2004/0267193 | A1 * | 12/2004 | Bagaoisan | A61B 17/00491 604/82 |
| 2005/0160808 | A1 | 7/2005 | Bingul et al. | |
| 2010/0038381 | A1 * | 2/2010 | Suchan | A61C 9/0026 222/137 |
| 2010/0281997 | A1 | 11/2010 | Jones, III | |
| 2015/0292931 | A1 * | 10/2015 | Penfold | G01F 11/023 222/71 |
| 2016/0250418 | A1 * | 9/2016 | Olson | A61M 5/2033 604/82 |
| 2018/0135762 | A1 * | 5/2018 | Mastro | B67D 1/0021 |

\* cited by examiner

BEVERAGE DISPENSERS WITH ADJUSTABLE VALVES

CROSS-REFERENCE TO RELATED APPLICATION

The present application is based on and claims priority to U.S. Provisional Patent Application Ser. No. 62/423,282 filed Nov. 17, 2016 and U.S. Provisional Patent Application Ser. No. 62/430,648 filed Dec. 6, 2016, the disclosures of which are incorporated herein by reference.

FIELD

The present disclosure relates to beverage dispensers with adjustable valves that vary the flow ratio of fluids dispensed therefrom.

BACKGROUND

The following U.S. patent is incorporated herein by reference, in entirety:

U.S. Pat. No. 5,845,815 discloses a piston based flow control for use in a high flow beverage dispensing valve. The piston thereof includes a top perimeter edge structure that allows for continuity of liquid flow during high flow applications and particularly during the initiation of a high flow dispensing so as to eliminate chattering of the piston.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a beverage dispensing valve includes a housing defining a chamber with an inlet for receiving a fluid and an outlet for dispensing the fluid. A piston is located in the chamber and subjected to a fluid pressure exerted by the fluid received via the inlet. The piston is moved axially in the chamber by the fluid pressure such that the piston determines a flow characteristic of the fluid dispensed via the outlet. A plunger is received in the chamber, and the fluid pressure tends to move the piston towards the plunger. A spring tends to move the piston away from the plunger, against the fluid pressure. The plunger is axially registered in the chamber in discrete plunger positions, and each plunger position sets a discrete limit on axial movement of the piston thereby providing a predetermined flow characteristic of the fluid dispensed via the outlet.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Beverage dispensing valves are commonly used in the industry for dispensing post-mix beverages to an operator or consumer. The valve receives two independent pressurized fluids (e.g. flavor syrup and carbonated water) and dispenses a mixed beverage formed from the two fluids at a desired flow rate (e.g. ounces per second) and a desired flow ratio (e.g. 3:1, 4:1, 5:1). The valve controls (i.e. limits) the flow of the two fluids independently of each other in order to achieve the desired flow ratio between the fluids (e.g. the valve is configured to dispense four parts of a first fluid, e.g. carbonated water, and one part of a second fluid, e.g. flavor syrup, such that the fluid flow ratio of the valve is 4:1). Reference is made to above incorporated U.S. Pat. No. 5,845,815 for further description of the components and operation of a prior art beverage dispensing valve.

The present inventors have endeavored to make improvements to the valves commonly used in the industry, and the present inventors have sought to invent a valve that allows easy adjustment of the flow ratio. Specifically, the present inventors have recognized that technicians must manually adjust the valves to achieve the desired flow ratio of the two fluids and non-technicians (e.g. operators) may alter the flow ratio of the valves. Incorrect manual adjustment of the valves can create inefficiencies that require servicing and/or replacement, which is time consuming and costly. Accordingly, the present inventors have invented the presently disclosed valves having components that minimize the amount of time a technician spends adjusting the valve, increase consistency among valves with the same desired flow ratios, and prevent tampering (or at least show clear signs of tampering) of the valves after the technician sets the desired flow ratio.

Figure 1:
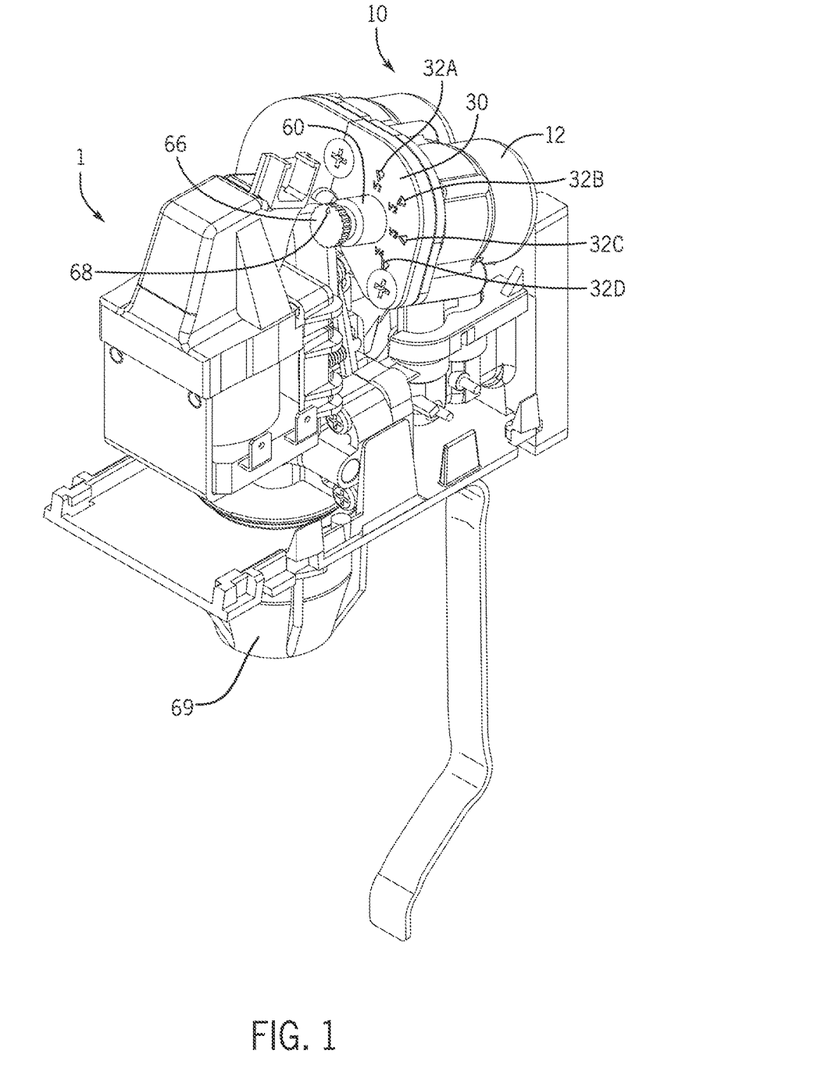
FIG. 1 is a beverage dispensing valve with an example flow control module.
Figure 2:
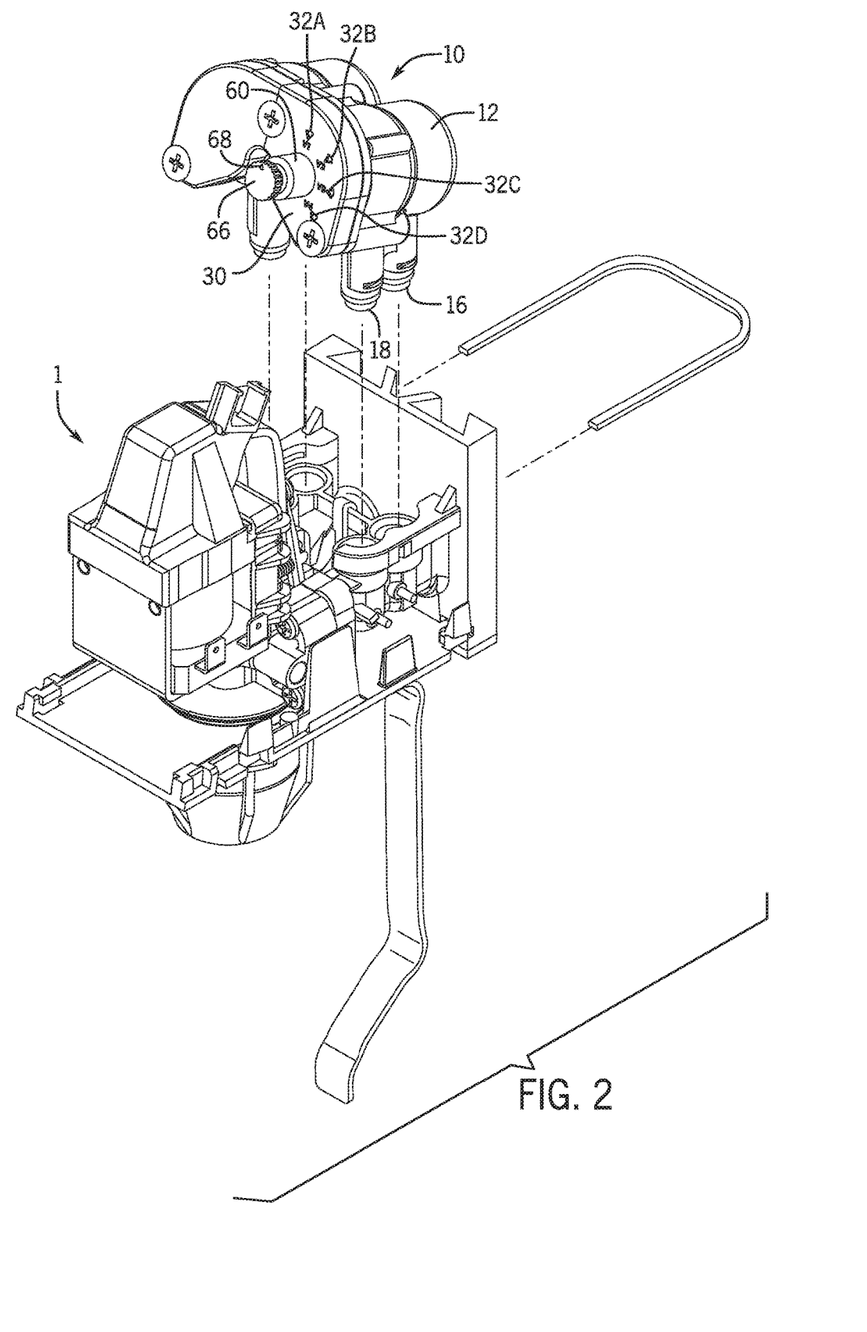
FIG. 2 is a partial exploded view of the beverage dispensing valve of FIG. 1. The flow control module is shown separated from the beverage dispensing valve.

FIGS. 1-2 depict an example beverage dispensing valve 1 of the present disclosure. The valve 1 includes a removable flow control module 10 (see also FIG. 3) having a housing 12 that defines a chamber 14 (FIG. 4) configured to receive a fluid (e.g. flavoring syrup). It will be recognized that the flow control module 10 can define a second chamber for receiving and dispensing an additional fluid (e.g. carbonated water). Therefore, the description of components and features described herein with respect to the fluid may be similarly applied to the receipt and dispense of additional fluids by the valve 1. A nozzle 69 is configured to mix and dispense the first and second fluids as a mixed beverage.

Referring to FIGS. 3-7, the flow control module 10 is shown in greater detail. The chamber 14 (FIG. 4) has an inlet 16 for receiving a fluid and an outlet 18 for dispensing the fluid. The valve 1 includes a sleeve 19 and a piston 20 (FIG. 4) that are positioned in the chamber 14. The piston 20 is subjected to a fluid pressure exerted by the fluid received via the inlet 16. The axial position of the piston 20 in the chamber 14 determines a flow characteristic (e.g. flow rate, volume) of the fluid dispensed via the outlet 18.

Figure 4:
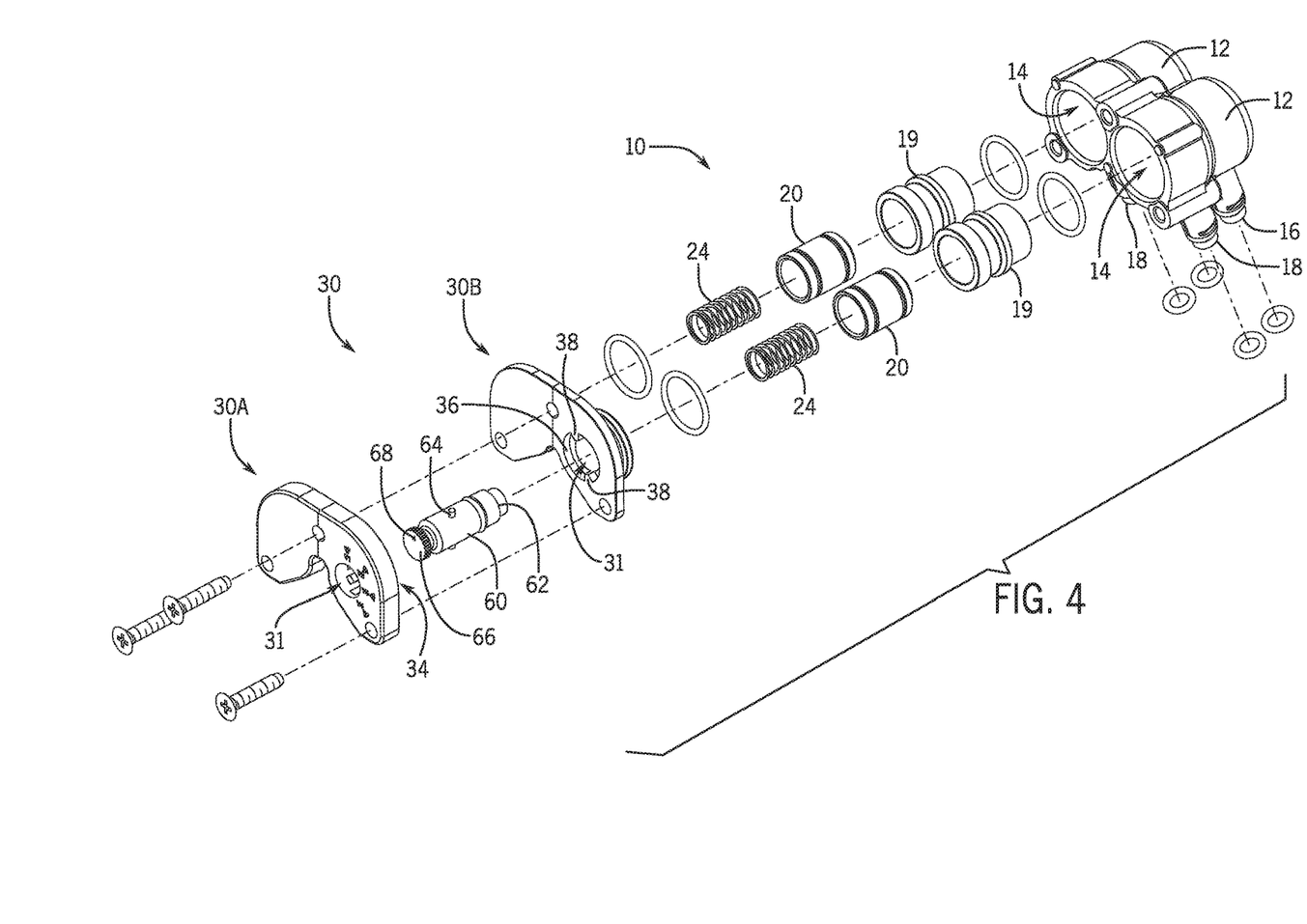
FIG. 4 is an exploded view of the flow control module of FIG. 3.

A selector block 30 is coupled to the housing 12 and defines a bore 31 that is in communication with chamber 14 (the selector block 30 is described in greater detail herein). A plunger 60 is received in the bore 31 and/or the chamber 14 such that the fluid pressure exerted on the piston 20 tends to move the piston 20 towards the plunger 60. A spring 24 is positioned in the chamber 14 and tends to move the piston 20 away from the plunger 60 (i.e. the spring 24 tends to move the piston 20 against the direction of the fluid pressure and the plunger 60 in the opposite axial direction). Note that the selector block 30 is shown in FIG. 4 with a first portion 30A and a second portion 30B, each portion having a pair of halves. In other examples, the portions 30A, 30B and/or the halves of the portions 30A, 30B can be integral with each other.

The plunger 60 is configured to axially move (including reciprocate) within the chamber 14 to thereby compress the spring 24 such that the spring 24 limits the axial movement of the piston 20 when the fluid pressure acts of the piston 20. The plunger 60 is axially registered in discrete plunger positions, and each plunger position sets a discrete limit on axial movement of the piston 20 thereby providing a predetermined flow characteristic of the fluid dispensed via the outlet 18. That is, the plunger 60 is axially registered to a desired discrete plunger position within the chamber 14 such that the spring 24 is compressed and applies a discrete compressive force on the piston 20 in the opposite direction of the fluid pressure acting on the piston 20. As such, the plunger 60 and/or the spring 24 sets a desired fixed limit on the movement of the piston 20 within the chamber 14 and thus define discrete predetermined flow characteristics of the fluid dispensed via the outlet 18. The plunger 60 is axially movable in chamber 14 into and between discrete and incremental predetermined plunger positions. The plunger 60 is positively retained in the plunger positions.

Figure 12:
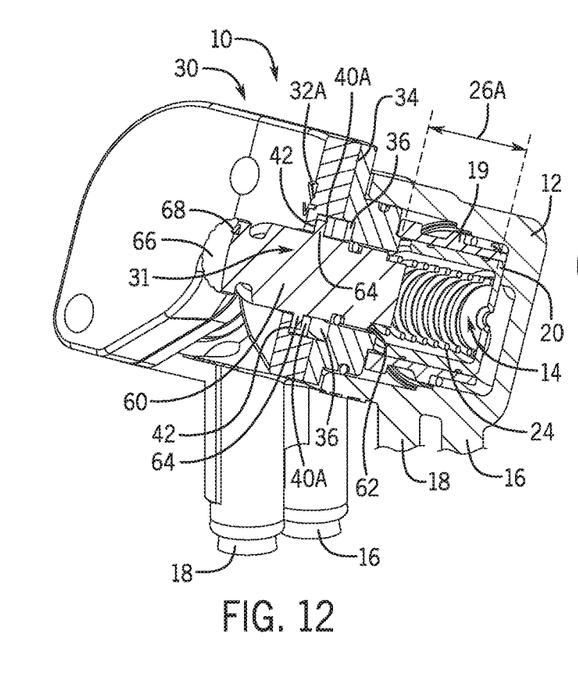
FIG. 12 is a partial cross sectional view of the flow control module of FIG. 3 along line 8-8 on FIG. 3. The plunger is in the first plunger position and flanges of the plunger are received in first channels.
Figure 16:
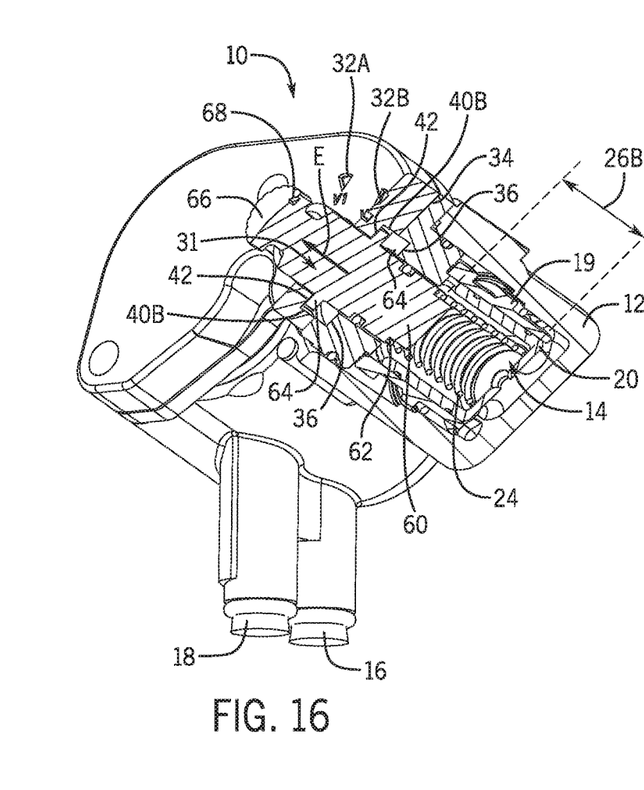
FIG. 16 is a view like FIG. 15 with the plunger released such that the plunger is moved to a second plunger position in which the flanges are received in the second channels.

Furthermore, the plunger 60 limits a spring height of the spring 24 which is the distance defined between the plunger 60 and the piston 20 (e.g. see FIG. 12 which depicts an example first spring height 26A of the spring 24 and see FIG. 16 which depicts an example second spring height 26B of the spring 24). The spring height of the spring 24 also correlates to the flow characteristic (e.g. flow rate) of the fluid dispensed via the outlet 18. The compressive force applied by the spring 24 to the piston 20 and/or the plunger 60 varies based on the spring height (e.g. a first spring height applies a first compressive force on the piston 20 and/or the plunger) and the physical properties of the spring 24.

Figure 3:
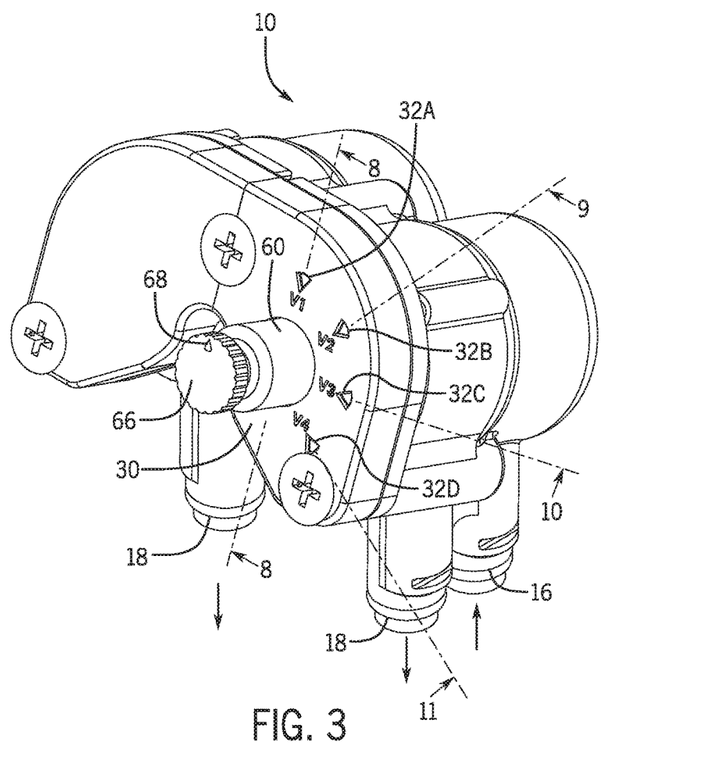
FIG. 3 is an enlarged view of an example flow control module.
Figures 10, 11:
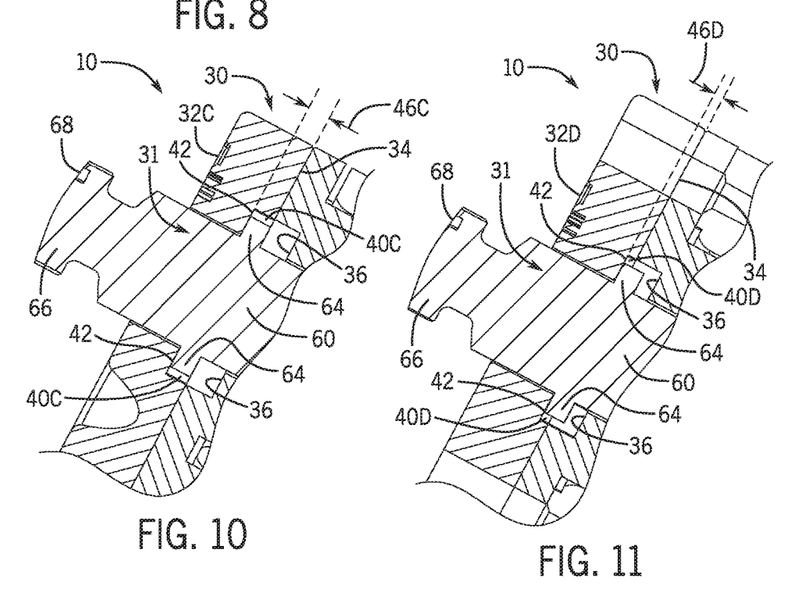
FIG. 10 is a view like FIG. 8 along line 10-10 on FIG. 3. The plunger is shown in a third plunger position.
FIG. 11 is a view like FIG. 8 along line 11-11 on FIG. 3. The plunger is shown in a fourth plunger position.

In the example depicted in FIG. 3, the plunger 60 is configured to define four fixed limits on the movement of the piston 20 within the chamber 14 and/or spring heights of the spring 24. As will be described in greater detail herein, the operator changes the position of the plunger (i.e. the plunger position) by engaging (i.e. applying a pushing, pulling, and/or rotational force) the dial 66 of the plunger 60. The plunger position is observed by the operator when the operator examines the alignment of an indicator 68 on the dial 66 with a position indicator 32A, 32B, 32C, 32D of the selector block 30. For example, when the indicator 68 is aligned with a first position indicator 32A the plunger 60 is in the first plunger position (FIG. 8) and when the indicator 68 is aligned with a fourth position indicator 32D the plunger 60 is in the fourth plunger position (FIG. 11).

The plunger 60 includes a spring contact surface 62 configured to contact the spring 24. The plunger 60 tends to move away from the piston 20 due to the compressive force applied by the spring 24 to the plunger 60 (i.e. the compressive force of the spring 24 tends to move the plunger 60 away from the piston 20). The plunger 60 includes a flange 64 that radially extends from the plunger 60 and is configured to contact the selector block 30 such that the plunger 60 is prevented from being pushed out of (i.e. ejected) from the chamber 14 and/or the bore 31 by the spring 24. The number of flanges 64 can vary. In the example shown in FIGS. 3-6, the plunger 60 has two flanges 64. A person having ordinary skill in the art will also recognize that the plunger 60 and/or the spring contact surface 62 can be any shape or size (e.g. the plunger 60 is cylindrical and the spring contact surface 62 is annular).

Figure 5:
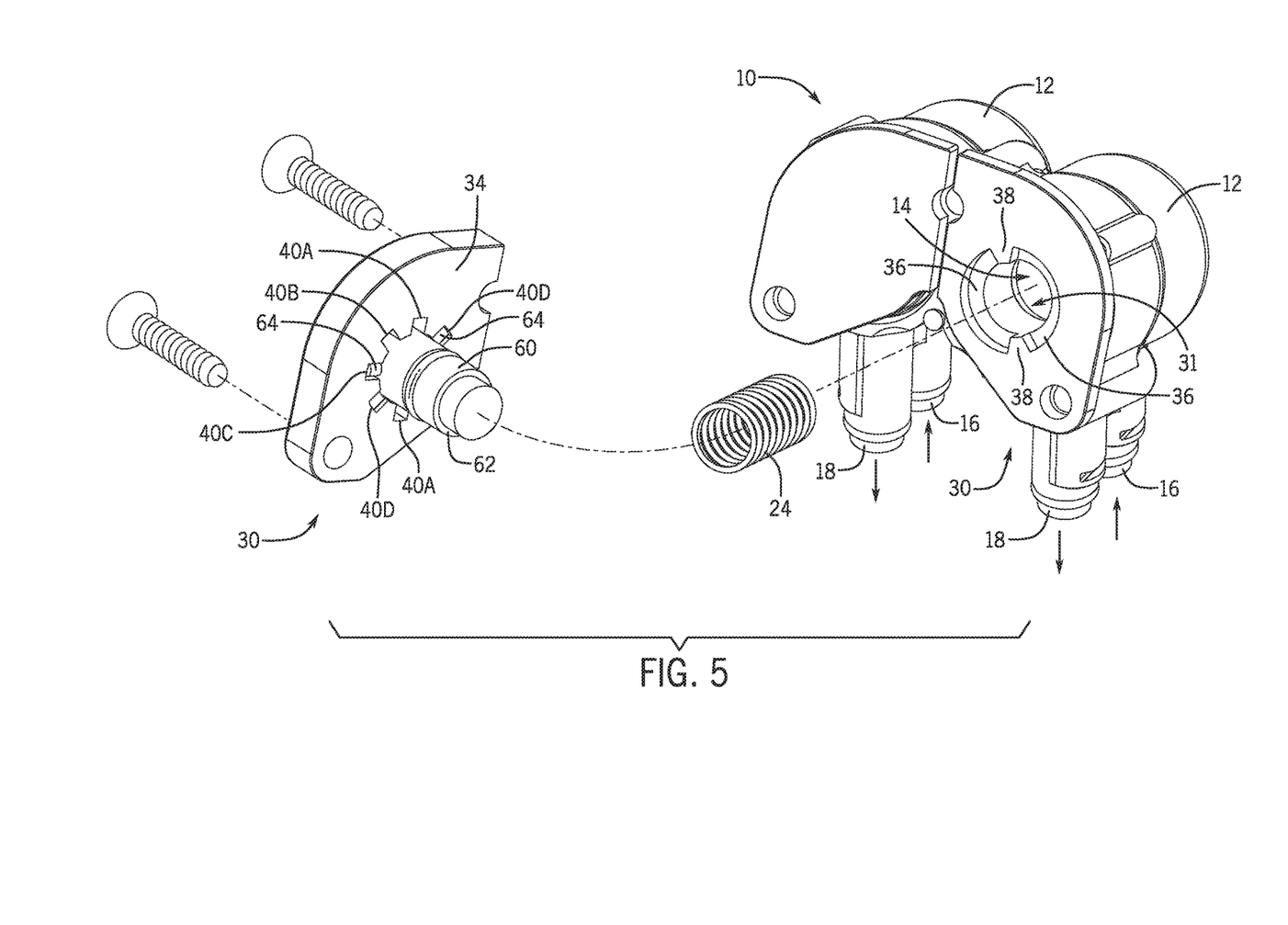
FIG. 5 is the flow control module of FIG. 3 with a selector block separated from the flow control module.

Referring to FIG. 5, the selector block 30 includes channels 40A, 40B, 40C, 40D that are configured to receive the flange(s) 64 of the plunger 60. In the example depicted in FIG. 6, a diametrically identical set of channels 40A, 40B, 40C, 40D are included. Each channel 40A, 40B, 40C, 40D has a stop surface 42 that contacts the flange 64 when the flange 64 is received in the channel 40A, 40B, 40C, 40D and is configured to stop axial movement of the plunger 60 away from the piston 20 (i.e. the stop surface 42 contacts the flange 64 and prevents the plunger 60 from moving axially outward past the stop surface 42). Each channel 40A, 40B, 40C, 40D also has a channel length 46A, 46B, 46C, 46D that extends from a perimetral surface 34 of the selector block 30 to the stop surface 42. The channel length(s) 46A, 46B, 46C, 46D can vary. In certain examples, the selector block 30 includes sloped surfaces 65 (shown in dashed lines on FIG. 7) positioned on the perimetral surface 34 and configured to guide the flange 64 into one of the channels 40A, 40B, 40C, 40D. A person having ordinary skill in the art will recognize that the flange 64 and/or the channels 40A, 40B, 40C, 40D can be part of the plunger 60 or the selector block 30.

Figure 6:
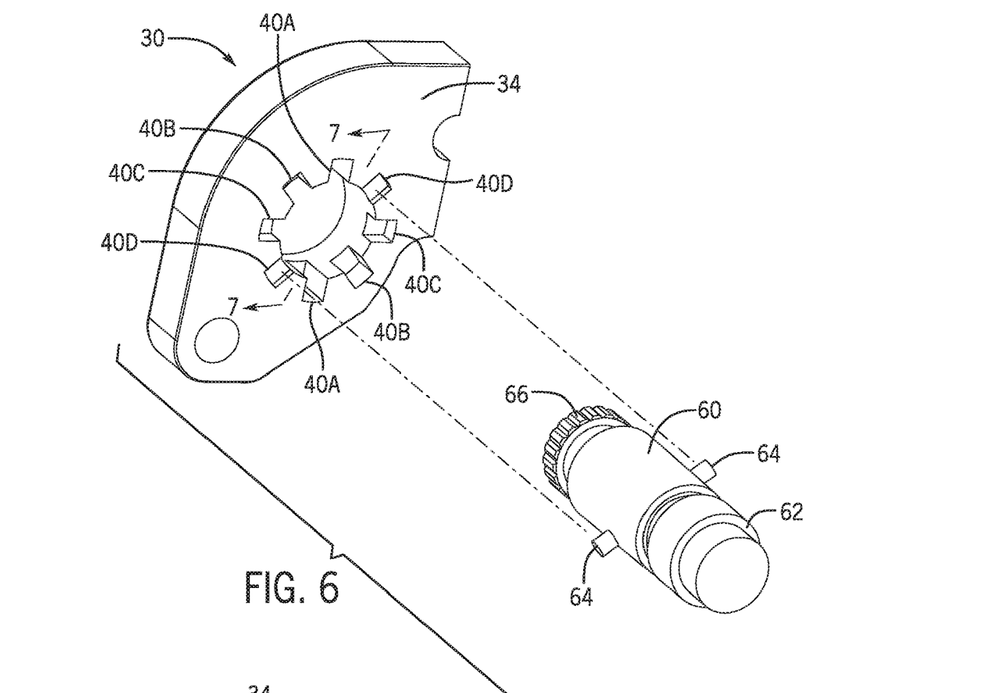
FIG. 6 is an example selector block and an example plunger.
Figure 7:
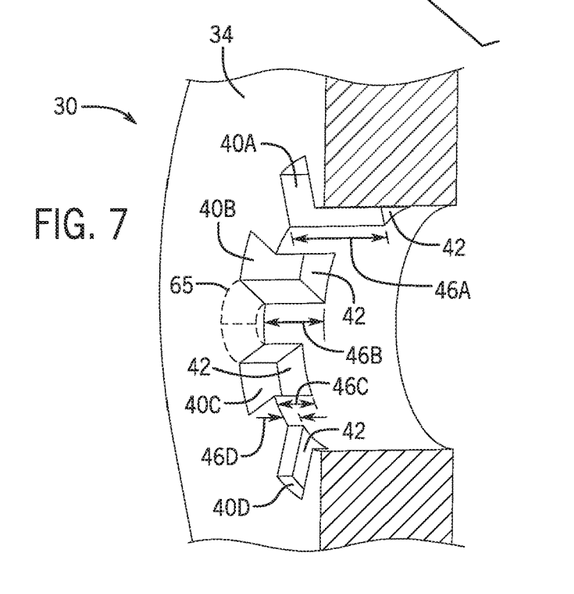
FIG. 7 is an enlarged view along line 7-7 on FIG. 6

In the example depicted FIGS. 6-7, each pair of channels 40A, 40B, 40C, 40D has a different channel length 46A, 46B, 46C, 46D. For instance, channels 40A have channel lengths 46A, channels 40B have channel lengths 46D, and so on. The plunger 60 in this example has two flanges 64 that are configured to be received in a desired pair of channels 40A, 40B, 40C, 40D (e.g. in FIG. 6 the flanges 64 of the plunger 60 are received in channels 40D). In operation, the operator can selectively align the flanges 64 of the plunger 60 with the desired pair of channels 40A, 40B, 40C, 40D by axially moving and rotating the plunger 60. Once the flanges 64 are aligned with the desired pair of channels 40A, 40B, 40C, 40D and operator releases the plunger 60 (i.e. stops applying a pushing force on the plunger 60) such that the spring 24 axially moves the plunger 60 away from the piston 20 and the flanges 64 are moved into the desired pair of channels 40A, 40B, 40C, 40D. Accordingly, changing the plunger position quickly and efficiently changes the desired fixed limit on the movement of the piston 20 within the chamber 14 and/or the spring height of the spring 24 and thus changes the flow characteristic of the fluid dispensed via the outlet 18.

Figure 8:
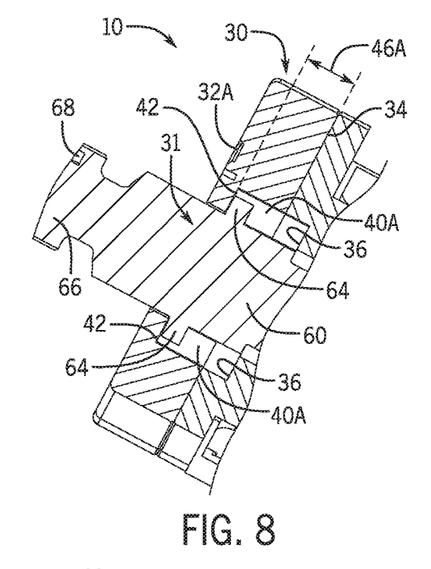
FIG. 8 is a partial cross sectional view of the flow control module of FIG. 3 along line 8-8 on FIG. 3. The plunger is shown in a first plunger position.
Figure 9:
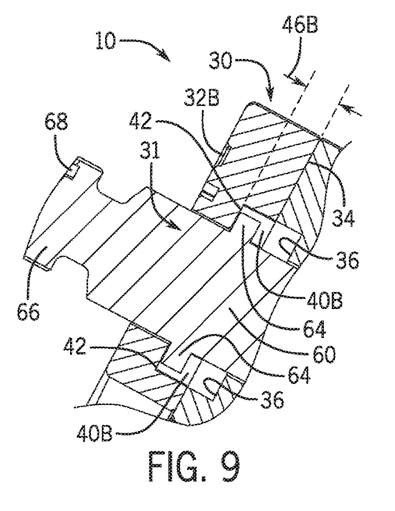
FIG. 9 is a view like FIG. 8 along line 9-9 on FIG. 3. The plunger is shown in a second plunger position.

Referring to FIGS. 8-11, partial cross sectional views of the flow control module 10 are depicted. FIG. 8 depicts the plunger in first plunger position such that the flanges 64 are received in channels 40A. FIG. 9, which is 45 degrees offset from the cross sectional view of FIG. 8, depicts the plunger 60 in a second plunger position such that the flanges 64 are received in channel 40B. FIG. 10, which is 45 degrees offset from the cross sectional view of FIG. 9, depicts the plunger 60 in a third plunger position such that the flanges 64 are received in channel 40C. FIG. 11, which is 45 degrees offset from the cross sectional view of FIG. 10, depicts the plunger 60 in a fourth plunger position such that the flanges 64 are received in channel 40D. The degrees of offset of the channels 40A-D relative to each other can vary.

Figures 13, 14:
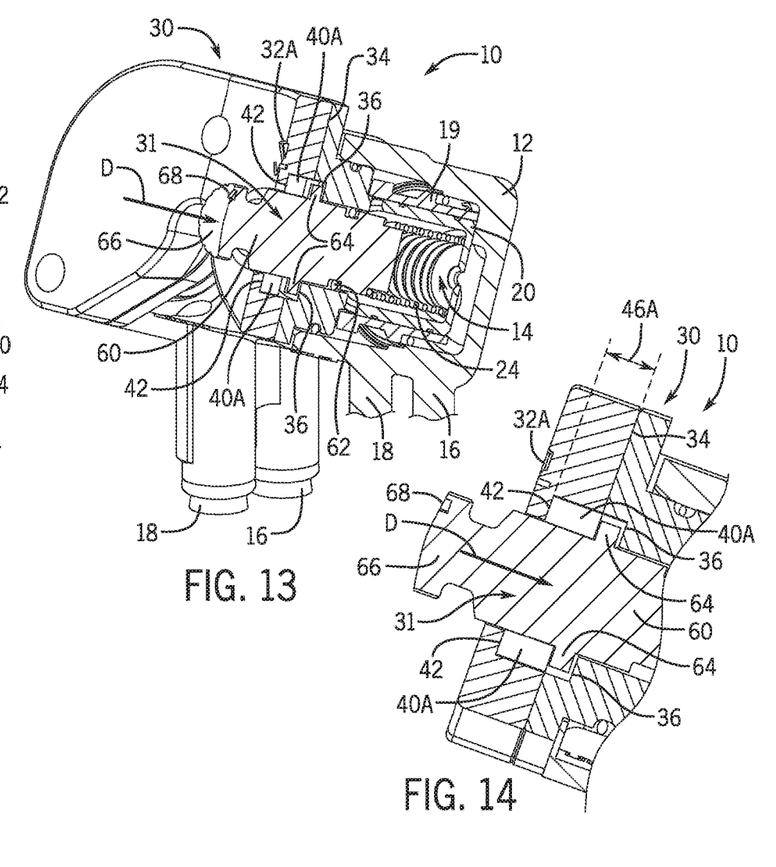
FIG. 13 is a view like FIG. 12 with the plunger depressed into the flow control module such that the plunger is in a neutral plunger position.
FIG. 14 is an enlarged view of the plunger and selector block of FIG. 13.

FIGS. 12-16 depict an example operation of the flow control module 10. FIG. 12 depicts the plunger 60 in a first plunger position in which the flanges 64 contact the stop surfaces 42 of channels 40A and the spring contact surface 62 compresses the spring to a first spring height 26A. As such, the movement of the piston 20 within the chamber 14 is limited by the spring 24 and a first flow characteristic of the fluid (e.g. 0.50 ounces per second flow rate) dispensed via the outlet 18 is defined. During operation, the fluid pressure exerted by the fluid received via the inlet 16 causes the piston 20 to axially move to a first piston position (not shown) and the fluid dispensed via the outlet has the first flow characteristic FIGS. 13-14 depicts the plunger 60 being depressed by the operator (see force arrow D) to a neutral plunger position in which the flanges 64 of the plunger 60 are displaced from the channels 40A and the spring contact surface 62 compresses the spring 24. The plunger 60 is prevented from axially moving past the neutral plunger position (in the direction toward the piston 20) by a neutral contact surface 36 of the selector block 30. In certain examples, the flanges 64 contact the neutral contact surface 36 when the operator depresses the plunger 60 (see force arrow D). The size and shape of the neutral contact surface 36 can vary. Referring back to FIG. 5, the neutral contact surface 36 is two annular sections divided by tabs 38. The tabs 38 limit the rotation of the plunger 60.

Figure 15:
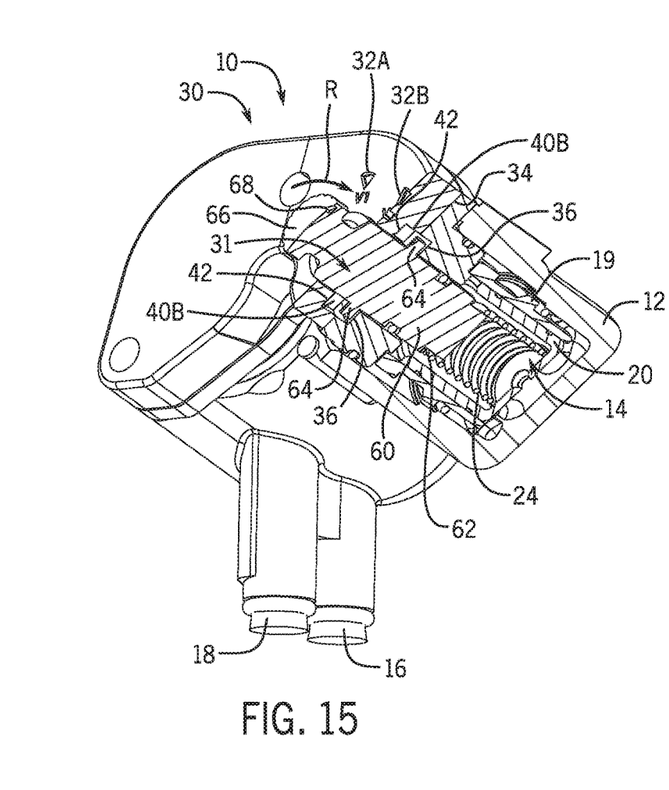
FIG. 15 is a partial cross sectional view of the flow control module of FIG. 3 along line 9-9 on FIG. 3. The plunger is shown rotated such that the flanges of the plunger are aligned with second channels.

FIG. 15 depicts the plunger 60 being rotated by the operator (see rotation arrow R) such that the flanges 64 align with channels 40B. The operator releases the plunger 60 (i.e. stops depressing the plunger 60) and the plunger 60 is slidably moved by the spring 24 to the second plunger position in which the flanges 64 are received in the channels 40B and contact the stop surfaces 42. Thus, during operation of the valve 1 the fluid pressure exerted by the fluid received via the inlet 16 causes the piston 20 to axially move to a second piston position (not shown) which is different than the first piston position (described above). As such, the fluid dispensed via the outlet 18 has a second flow characteristic (e.g. 0.52 ounces per second flow rate) that is different than the first flow characteristic.

Similar operation sequences can be utilized to move the plunger 60 between any number of plunger positions (e.g. the plunger 60 can be moved from the second plunger position to the fourth plunger position (FIG. 11); the plunger 60 can be moved from the fourth plunger position (FIG. 11) to the third plunger position (FIG. 12); the plunger 60 can be moved from the third plunger position (FIG. 12) to the first plunger position (FIGS. 8 and 12)). Note that the plunger 60 can be rotated clockwise or counterclockwise.

Through research and experimentation, the present inventors have determined several plunger positions that correspond to desired flow characteristics of the fluid dispensed via the outlet 18. That is, the present inventors have determined that based on the physical properties of the chamber 14, the piston 20, the spring 24, the plunger 60, and/or the fluid properties (e.g. viscosity, pressure, flow rate) of the fluid received via the inlet 16 the plunger positions can be determined to accommodate different fluids and/or different flow rate or flow ratios of the fluids. As is briefly mentioned above, the valve receives two independent pressurized fluids. In one example, a first fluid (e.g. carbonated water) is received and dispensed at a fixed flow rate (e.g. 2.6 ounces per second). In order to achieve a desired flow ratio (e.g. 4:1, 5:1) of the first fluid and a second fluid (e.g. flavor syrup), the plunger 60 can be moved to different plunger positions. In another example, to achieve a 5:1 flow ratio the plunger 60 is moved to the first plunger position and to achieve a 6:1 flow ratio the plunger 60 is moved to the second plunger position. In another example, while in the first plunger position, the flange 64 of the plunger 60 is received in channel 40A such that the spring 24 is compressed to a spring height of 0.845 inches. In the second plunger position, the flange 64 of the plunger 60 is received in channel 40B such that the spring 24 is compressed to a spring height of 0.772 inches. In the third plunger position, the flange 64 of the plunger 60 is received in channel 40C such that the spring 24 is compressed to a spring height of 0.726 inches. In the fourth plunger position, the flange 64 of the plunger 60 is located in channel 40D such that the spring 24 is compressed to a spring height of 0.679 inches.

In other examples, an additional plunger and selector block are provided to control a flow characteristic of the additional fluids (e.g. carbonated water) dispensed by the valve 1 such that the flow rate of the additional fluids can be adjusted. In this example, the both plungers are adjusted relative to each other and the other components of the valve 1 to achieve the desired flow ratio (e.g. the first plunger is moved to a second plunger position and the second plunger is moved to a fourth plunger position such that the flow ratio of the first fluid and the second fluid dispensed from the valve 1 is 5.5:1.0).

In still other examples, the present inventors have recognized that different fluids received and dispensed from the valve have different viscosities which will affect the flow rate and the flow ratio through the valve 1. For instance, when the flow rate of the first fluid is fixed (e.g. 2.6 ounces per second), the plunger 60 can be moved to different plunger positions based on the viscosity of the second fluid connected to the valve 1 to thereby maintain a flow rate of the second fluid (e.g. 0.47-0.52 ounces per second). For example, branded beverages (e.g. Coca-Cola, Pepsi) can have distinct flavoring syrups (i.e. second fluids) that are mixed with carbonated water (i.e. first fluid) to form the branded beverage dispensed from the valve 1. Depending on the branded beverage dispensed from the valve 1, the present inventors have determined which plunger position the plunger 60 should be located to correctly dispense the branded beverage from the valve 1. For example, the plunger 60 is moved to a first plunger position when the second fluid is flavor syrup A having a viscosity of 1.5-1.6 centipose (cP) such that the flow rate of flavor syrup A is 0.52 ounces per second (oz/sec) and flow ratio of the branded beverage dispensed from the valve 1 is 5:1 or flavor syrup B having a viscosity of 12.4-12.7 cP such that the flow rate of flavor syrup B is 0.52 oz/sec and flow ratio of the branded beverage dispensed from the valve 1 is 5:1.

The plunger 60 is moved to a second plunger position when the second fluid is flavor syrup C having a viscosity of 55.9-58.3 cP such that the flow rate of flavor syrup C is 0.52 oz/sec and flow ratio of the branded beverage dispensed from the valve 1 is 5:1; flavor syrup D having a viscosity of 94.6-96.7 cP such that the flow rate of flavor syrup D is 0.52 oz/sec and flow ratio of the branded beverage dispensed from the valve 1 is 5:1; or flavor syrup E having a viscosity of 145.0-150.0 cP such that the flow rate of flavor syrup E is 0.43 oz/sec and flow ratio of the branded beverage dispensed from the valve 1 is 6:1

The plunger 60 is moved to a third plunger position when the second fluid is flavor syrup F having a viscosity of 128.0-132.7 cP such that the flow rate of flavor syrup F is 0.52 oz/sec and flow ratio of the branded beverage dispensed from the valve 1 is 5:1; or flavor syrup G having a viscosity of 179.6-185.5 cP such that the flow rate of flavor syrup G is 0.47 oz/sec and flow ratio of the branded beverage dispensed from the valve 1 is 5.5:1.

The plunger 60 is moved to a fourth plunger position when the second fluid is flavor syrup H having a viscosity of 179.6-185.5 cP such that the flow rate of flavor syrup H is 0.52 oz/sec and flow ratio of the branded beverage dispensed from the valve 1 is 5:1.

In the present description, certain terms have been used for brevity, clarity, and understanding. No unnecessary limitations are to be inferred therefrom beyond the requirement of the prior art because such terms are used for descriptive purposes only and are intended to be broadly construed. The different apparatuses and systems described herein may be used alone or in combination with other apparatuses and systems. Various equivalents, alternatives and modifications are possible within the scope of the appended claims.

What is claimed is:

1. A beverage dispensing valve comprising:
    a flow control module having
        a first chamber configured to dispense a first fluid, the first chamber containing a first piston that is axially movable in the first chamber so as to control flow of the first fluid through the first chamber, a first spring that biases the first piston against fluid pressure from the first fluid towards a position in which the first position prevents flow of the first fluid through the first chamber, and a plunger engaged with the first spring such that the first spring biases the first piston away from the plunger, and
        a second chamber configured to dispense a second fluid, the second chamber containing a second piston that is axially movable in the second chamber so as to control flow of the second fluid through the second chamber, a second spring that biases the second piston against fluid pressure from the second fluid towards a position in which the second position prevents flow of the second fluid through the second chamber;
    a selector block having
        a bore aligned with the first chamber, wherein the plunger extends through the bore and is manually engageable with the selector block in a plurality of discrete plunger positions that each set a different respective limit on axial movement of the first position in the first chamber, thus producing a different respective flow characteristic of the first fluid through the first chamber, wherein each of the plurality of discrete plunger positions corresponds to a different respective mixed beverage having a different respective flow ratio of the first and second fluids, and
        an indicator that indicates to an operator a current discrete plunger position of the plunger amongst the plurality of discrete plunger positions; and
    a nozzle configured to mix and dispense the first and second fluids as a mixed beverage having the flow ratio according to the current discrete plunger position.

2. The beverage dispensing valve according to claim 1, wherein the plunger is manually positionable into the plurality of discrete plunger positions.

3. The beverage dispensing valve according to claim 2, wherein the plunger is retained in position with the selector block in each of the plurality of discrete plunger positions.

4. The beverage dispensing valve according to claim 3, wherein the plunger is rotatable into each of the plurality of discrete plunger positions.

5. The beverage dispensing valve according to claim 4, wherein the indicator comprises a dial on the plunger and a plurality of position indicators on the selector block.

6. The beverage dispensing valve according to claim 5, further comprising indicia on the dial that represents the current discrete plunger position of the plunger.

7. The beverage dispensing valve according to claim 1, wherein the plunger comprises a flange that engages with the selector block in each of the plurality of discrete plunger positions.

8. The beverage dispensing valve according to claim 7, wherein the selector block comprises a flat surface that faces the flow control module and plurality of channels formed into the flat surface and corresponding to the plurality of discrete plunger positions, each channel in the plurality of channels being configured to receive the flange of the plunger.

9. The beverage dispensing valve according to claim 8, wherein each channel extends from the flat surface into the selector block around the bore, and wherein each channel has an end wall that is contacted by the flange and limits axial movement of the plunger.

10. The beverage dispensing valve according to claim 9, wherein each channel has a different length respective to remaining channels in the plurality of channels, and thus each channel sets the different respective limit on axial movement of the first position in the first chamber.

* * * * *